(12) United States Patent
Balda Belzunegui et al.

(10) Patent No.: US 10,256,634 B2
(45) Date of Patent: Apr. 9, 2019

(54) POWER SUPPLY SYSTEM AND METHOD FOR ELECTRONIC CONVERTERS

(71) Applicant: INGETEAM POWER TECHNOLOGY, S.A., Zamudio (Vizcaya) (ES)

(72) Inventors: Julián Balda Belzunegui, Sarriguren (ES); Roberto González Senosiáin, Sarriguren (ES); Luis Pérez Nicuesa, Sarriguren (ES)

(73) Assignee: INGETEAM POWER TECHNOLOGY, S.A., Zamudio (Vizcaya) (ES)

( * ) Notice: Subject to any disclaimer, the term of this patent is extended or adjusted under 35 U.S.C. 154(b) by 499 days.

(21) Appl. No.: 14/891,503

(22) PCT Filed: May 17, 2013

(86) PCT No.: PCT/ES2013/070314
§ 371 (c)(1),
(2) Date: Nov. 16, 2015

(87) PCT Pub. No.: WO2014/184401
PCT Pub. Date: Nov. 20, 2014

(65) Prior Publication Data
US 2016/0118797 A1    Apr. 28, 2016

(51) Int. Cl.
*H02J 3/00* (2006.01)
*H02J 3/38* (2006.01)
(Continued)

(52) U.S. Cl.
CPC .............. *H02J 3/383* (2013.01); *H02J 3/382* (2013.01); *H02J 5/00* (2013.01); *H02J 9/062* (2013.01);
(Continued)

(58) Field of Classification Search
CPC .. H02J 9/061; H02J 9/062; H02J 3/382; H02J 3/383; H02J 5/00; H02M 3/04;
(Continued)

(56) References Cited

U.S. PATENT DOCUMENTS 7,629,708 B1    12/2009  Meyers et al.
2006/0158037 A1*  7/2006  Danley .................... H02J 3/32
                                                        307/64
(Continued)

FOREIGN PATENT DOCUMENTS

WO    2010063326 A1    6/2010

OTHER PUBLICATIONS

International Search Report dated Feb. 3, 2014 from the International Searching Authority in counterpart International application No. PCT/ES2013/070314.

*Primary Examiner* — Rexford Barnie
*Assistant Examiner* — Toan Vu
(74) *Attorney, Agent, or Firm* — Sughrue Mion, PLLC

(57) ABSTRACT

The object of the invention is to provide a power supply system and method for the various elements forming DC/AC electronic power converters that assures the operation of the converters during normal operating conditions and anomalous operating conditions, being specially designed for photovoltaic systems connected to the power grid and capable of providing direct current and alternating current voltages at the output thereof from at least one DC power source (1) and at least one AC power source (2), which basically comprises an output for DC loads (6) connected to the output of a DC/DC converter (3) the input of which is connected to the DC power source (1), an AC output for critical loads (7) connected to a first selector (5) configured for alternating between a first position where said AC output for critical loads (7) is connected to the output of a first DC/AC
(Continued)

converter (4) the input of which is connected to the DC power source (1), and a second position where said AC output for critical loads (7) is connected to the AC power source (2), an AC output for non-critical loads (8) connected to the AC power source (2) and a control unit (9) controlling the operation of said first selector (5).

6 Claims, 4 Drawing Sheets

(51) Int. Cl.
     *H02J 9/06*      (2006.01)
     *H02J 5/00*      (2016.01)
     *H02M 3/04*      (2006.01)
     *H02M 7/04*      (2006.01)
     *H02M 7/44*      (2006.01)

(52) U.S. Cl.
    CPC ............... *H02M 3/04* (2013.01); *H02M 7/04* (2013.01); *H02M 7/44* (2013.01); *Y02B 10/72* (2013.01); *Y02E 10/563* (2013.01); *Y02E 10/566* (2013.01)

(58) Field of Classification Search
    CPC ........... H02M 7/04; H02M 7/44; Y02B 10/72; Y02E 10/563; Y02E 10/566
    USPC .......................................................... 307/26
    See application file for complete search history.

(56) References Cited

U.S. PATENT DOCUMENTS

| | | | |
|---|---|---|---|
| 2006/0238031 A1 | 10/2006 | Frey | |
| 2009/0225501 A1* | 9/2009 | Luebke | H02J 9/06 361/644 |
| 2012/0267957 A1 | 10/2012 | Czarnecki | |
| 2013/0169064 A1* | 7/2013 | Park | H02J 3/28 307/112 |
| 2014/0285010 A1* | 9/2014 | Cameron | H02J 1/14 307/29 |

* cited by examiner

POWER SUPPLY SYSTEM AND METHOD FOR ELECTRONIC CONVERTERS

CROSS REFERENCE TO RELATED APPLICATIONS

This application is a National Stage of International Application No. PCT/ES2013/070314 filed May 17, 2013, the contents of all of which are incorporated herein by reference in their entirety.

OBJECT OF THE INVENTION

The main field of application of the present invention is the industry intended for the design of electronic devices, and more particularly to those conceived within the sector of electronic power converters for solar photovoltaic energy.

The object of the invention is to provide a power supply system and method for the various elements forming DC/AC electronic power converters (DC—direct current, AC—alternating current) that assures the operation of the converters during normal operating conditions and anomalous operating conditions, specially designed for photovoltaic systems connected to the power grid, characterized by their robustness, simplicity, safety, flexibility, low cost and low maintenance.

BACKGROUND

The grid-connected photovoltaic installations are formed by a set of photovoltaic modules (photovoltaic generator) and a DC/AC electronic power converter, also referred to as inverter, which conditions the energy produced by the photovoltaic modules and injects it into the power grid.

The inverter converts the direct current (DC) energy generated by the photovoltaic modules to alternating current (AC). Inverters are electronic power converters formed by different elements. Said elements can generally be: a power stage (where direct to alternating current conversion is performed), a filter stage, control devices, sensing elements, power supply sources, protections, monitoring relays, grid-connected relay or contactor and fans, among others.

The state of the art offers different options to feed the different elements forming the converter. One of them consists of feeding the control devices and sensing elements from a DC/DC power supply source which takes energy from the photovoltaic generator. The remaining higher power elements, such as contactors, monitoring relays, fans, etc., are supplied with alternating current (AC) from the power supply grid, because they are generally designed for alternating power supply.

Grid connection regulations for photovoltaic inverters include the need for the inverters to remain connected to the grid during power losses, assuring power supply continuity and therefore system stability.

In inverters with power supply systems where power comes from the AC grid, a power loss causes a power supply loss of the elements and, if the fed elements are contactors, the opening thereof. If it is specifically the grid-connected contactor, the inverter would be disconnected from the grid, not complying with the provisions established in the regulations.

There are different solutions for solving this problem in the state of the art.

The first of them consists of adding to the converter uninterrupted power supply systems that assure supply continuity. However, said systems incorporate batteries that make the system and its maintenance more expensive, while at the same time it is not very robust.

The second solution consists of incorporating capacitor banks, storing energy that will subsequently be used to feed the different elements during the course of the grid fault. The main drawback is that this system must be designed taking into account the maximum power loss time. These times vary in the regulations in force today according to different country requirements, so it would be difficult to design a universal solution. Furthermore, the ratio of energy to occupied volume is low in this solution, so it is necessary to allot a large space for the capacitor banks inside the converter.

Another option consists of replacing the contactors with motor-operated disconnectors. These elements switch from being open to closed and vice versa when a signal is applied to the motor that controls them. If the auxiliary power supply is lost permanently and it is necessary to change state, it will not be possible and the requirements of the regulations that make a disconnection mandatory in response to a power loss or power supply grid fault would not be complied with.

Finally, the literature also contains systems that can be fed in their entirety from the DC side, i.e., from the photovoltaic generator. On one hand, this entails a medium-power DC/DC conversion stage, reducing system efficiency and increasing the final converter cost.

The present invention has a power supply system providing different outputs for different types of loads:
  Critical load: load in which the energy supply thereof cannot be lost for correct equipment operation regardless of it being DC or AC, such as the controls, sensors and grid-connected elements such as contactors for example.
  Non-critical load: load in which the energy supply thereof can be lost. These are elements that can be temporarily disconnected, such as during a grid fault, for example, because the absence thereof during a short time has no effect on the correct operation of the system. An example of this would be cooling fans, where the increase in the temperature of the system is not altered during a grid fault.

DESCRIPTION OF THE INVENTION

The proposed invention consists of a power supply system and method for electronic power converters capable of providing direct current and alternating current voltages at the output thereof. The system takes the energy from a DC power source, a photovoltaic generator for example, and an AC power source, the power grid for example. The proposed invention has different outputs that can be DC and AC outputs, which allows assigning critical or non-critical loads to each of them.

The system is formed by a DC power source to which two converters, a DC/DC converter and a first DC/AC converter, are connected.

The DC/DC converter can have several output voltage levels, for example, +5 V, −5 V, +12 V.

The AC outputs can be single-phase and/or three-phase outputs.

The system has at least one output for DC loads which is connected to the output of the DC/DC converter.

The system has at least two AC outputs:
  At least one AC output for critical loads which can be connected to the first DC/AC converter or to the AC power source.
  At least one AC output for non-critical loads which is connected to the AC power source.

The system has at least one control unit that selects the power source used for the AC output for critical loads depending on the availability of the power sources in the inputs of the system. In one operating state, the AC output for critical loads is fed from the AC power source. In another operating state, the AC output for critical loads is fed from the DC power source through the first DC/AC converter. A first selector feeds the AC output for critical loads from the AC power source or from the DC power source through the first DC/AC converter. The first selector is selected from mechanical devices, switching devices, diodes, etc.

The AC output for non-critical loads is fed from the AC power source.

In a preferred embodiment of the invention, the control unit is integrated in the first DC/AC converter and controls the operation of the first selector for selecting from where the AC output for critical loads is fed depending on the availability of the DC power source and of the AC power source. If, for example, the DC power source is a photovoltaic generator, it does not supply energy overnight and the AC output for critical loads is fed directly from the AC power source (for example, the AC grid). However, when the photovoltaic generator is capable of supplying energy to the AC output for critical loads, it changes the position of the first selector to feed said output through the first DC/AC converter. One of the advantages of this system is that the behavior of the system is independent of power grid fluctuations, for example, voltage dips.

In a second preferred embodiment similar to the first preferred embodiment, a first AC/DC converter that is connected between the AC output for critical loads and the output for DC loads, providing energy in the output for DC loads from the AC output for critical loads, is further included.

In a third preferred embodiment similar to the first preferred embodiment, instead of the DC output for DC loads, at least one DC output for non-critical loads and at least one DC output for critical loads is included instead of a single output for DC loads. A second AC/DC converter which is connected between the AC power source and the DC output for non-critical loads, being able to provide energy also to the DC output for critical loads from the AC power source according to the control exerted by the control unit, is also included. To that end, there is a second selector that allows feeding the DC output for critical loads from the DC/DC converter or from the second AC/DC converter. The second selector is selected from mechanical devices switching devices, diodes, etc.

A fourth preferred embodiment similar to the third preferred embodiment further comprises an additional second DC/AC converter the DC side of which is connected to the output of the DC/DC converter and the AC side of which is connected in the AC output for critical loads.

A robust system that allows reducing cost, improving performance and increasing the flexibility of the system as a result of its simple installation with respect to other proposals is therefore achieved. With this system, it is possible to use contactors and control and monitoring elements in DC that are currently very widespread on the market.

DESCRIPTION OF THE DRAWINGS

To complement the description that is being made and for the purpose of aiding to better understand the features of the invention according to a preferred practical embodiment thereof, a set of drawings is attached as an integral part of said description where the following is depicted with an illustrative and non-limiting character.

PREFERRED EMBODIMENT OF THE INVENTION

Figure 1:
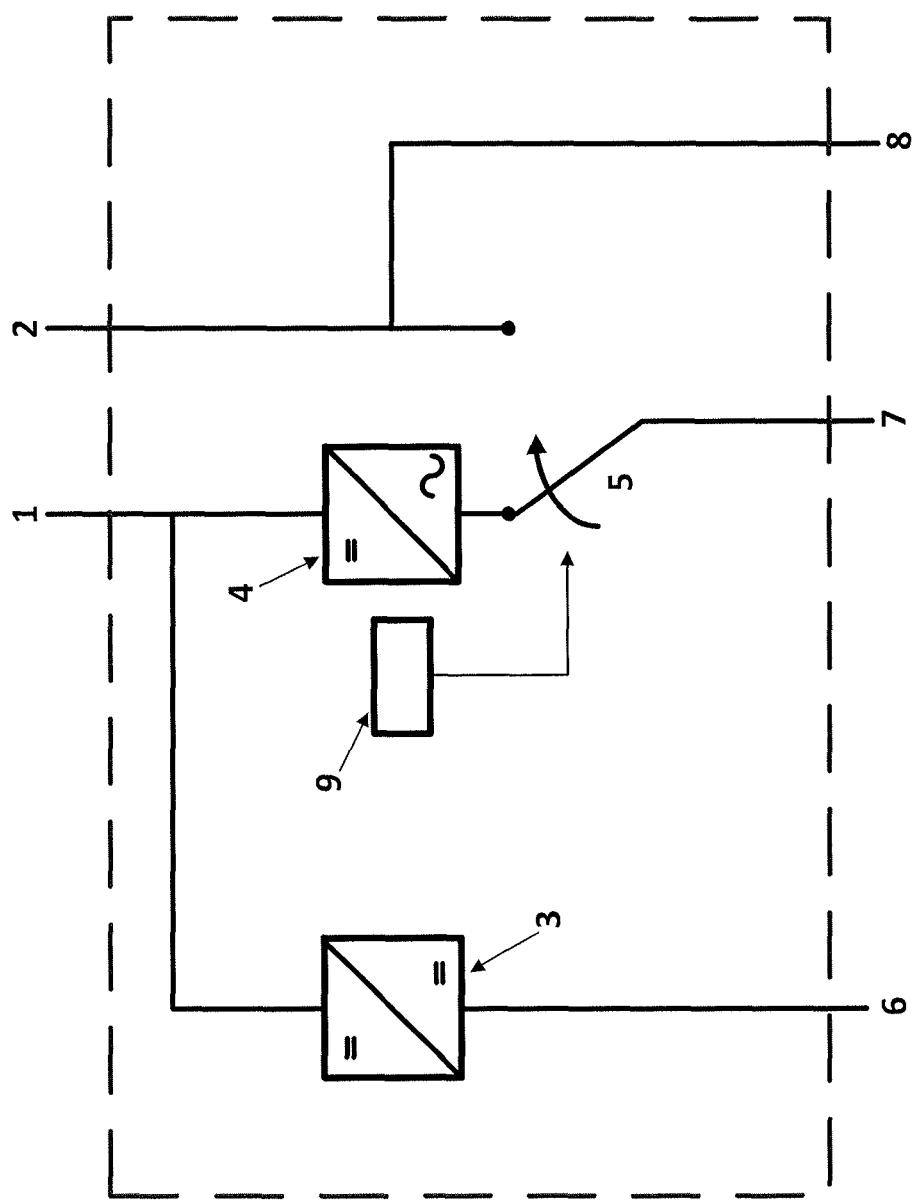
FIG. 1 shows a simplified diagram of the system of the proposed invention according to a first preferred embodiment of the invention.

FIG. 1 depicts a preferred embodiment of the system of the proposed invention. One input to the system is a DC power source (1), which can be a photovoltaic panel for example, and the other input of the system is an AC power source (2), which can be the power grid for example. The DC power source (1) is connected to the input of a DC/DC converter (3). The output for DC loads (6) of said DC/DC converter (3) can be connected to (critical and/or non-critical) DC loads; it is the output for DC loads (6). The system has two AC load outputs, an AC output for critical loads (7) and another AC output for non-critical loads (8). The AC output for critical loads (7) can be connected to a first DC/AC converter (4) or to the AC power source (2) according to the position of a first selector (5), the first DC/AC converter (4) in turn being connected to the DC power source (1). The AC output for non-critical loads (8) is connected to the AC power source (2). A control unit (9) manages the operation of the first selector (5) for selecting the power source (1, 2) used in the AC output for critical loads (7).

Therefore, if the DC power source (1) comprises photovoltaic panels, the operation of this system would be as follows: in normal operation, the control unit (9) keeps the first selector (5) in a first position corresponding to the power supply of the AC output for critical loads (7) from said DC power source (1) through the first DC/AC converter (4), whereas in anomalous operation, the control unit (9) operates the first selector (5) to go to a second position corresponding to the power supply of the AC output for critical loads (7) directly from the AC power source (2).

Normal operation is defined as the DC power source (1) being available and the first DC/AC converter (4) working. Anomalous operation is defined as at least one of the conditions defining normal operation not being complied with.

Figure 2:
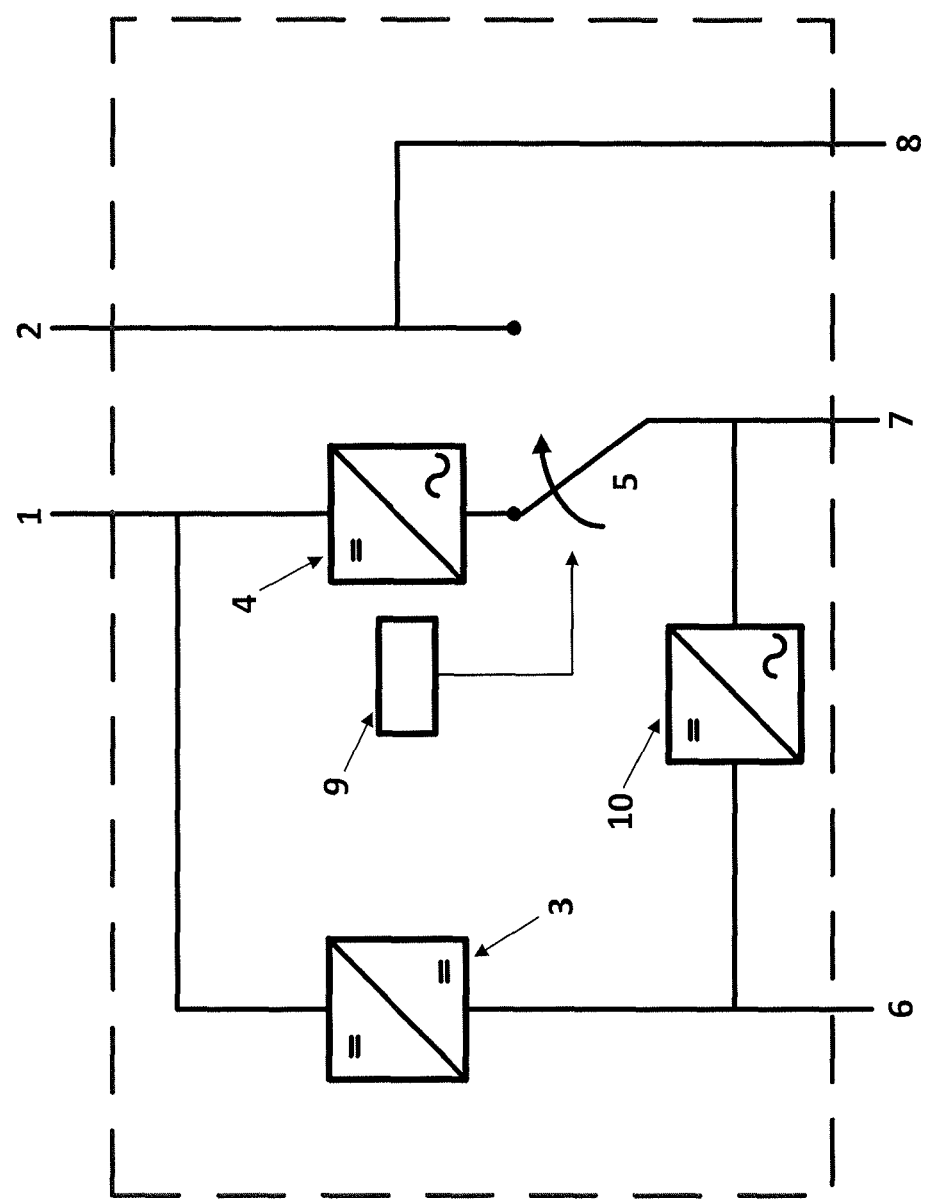
FIG. 2 shows a simplified diagram of the system of the proposed invention according to a second preferred embodiment of the invention.

FIG. 2 depicts a preferred embodiment of the invention in which a first AC/DC converter (10) connected between the AC output for critical loads (7) and the output for DC loads (6) is added to the system of FIG. 1. Therefore, similarly to that described previously, in normal operation the control unit (9) keeps the first selector (5) in a first position in which the AC output for critical loads (7) is fed through the first DC/AC converter (4). The output for DC loads (6) is fed both through the DC/DC converter (3) and through the first AC/DC converter (10). During anomalous operation, the first selector (5) switches to a second position where the AC output for critical loads (7) is fed directly from the AC power source (2), and the output for DC loads (6) is fed both through the DC/DC converter (3) and through the first AC/DC converter (10).

One of the advantages obtained with the preferred embodiment of FIG. 2 is that if the DC power source (1) is not available, the output for DC loads (6) is fed from the AC power source (2) through the first AC/DC converter (10).

Figure 3:
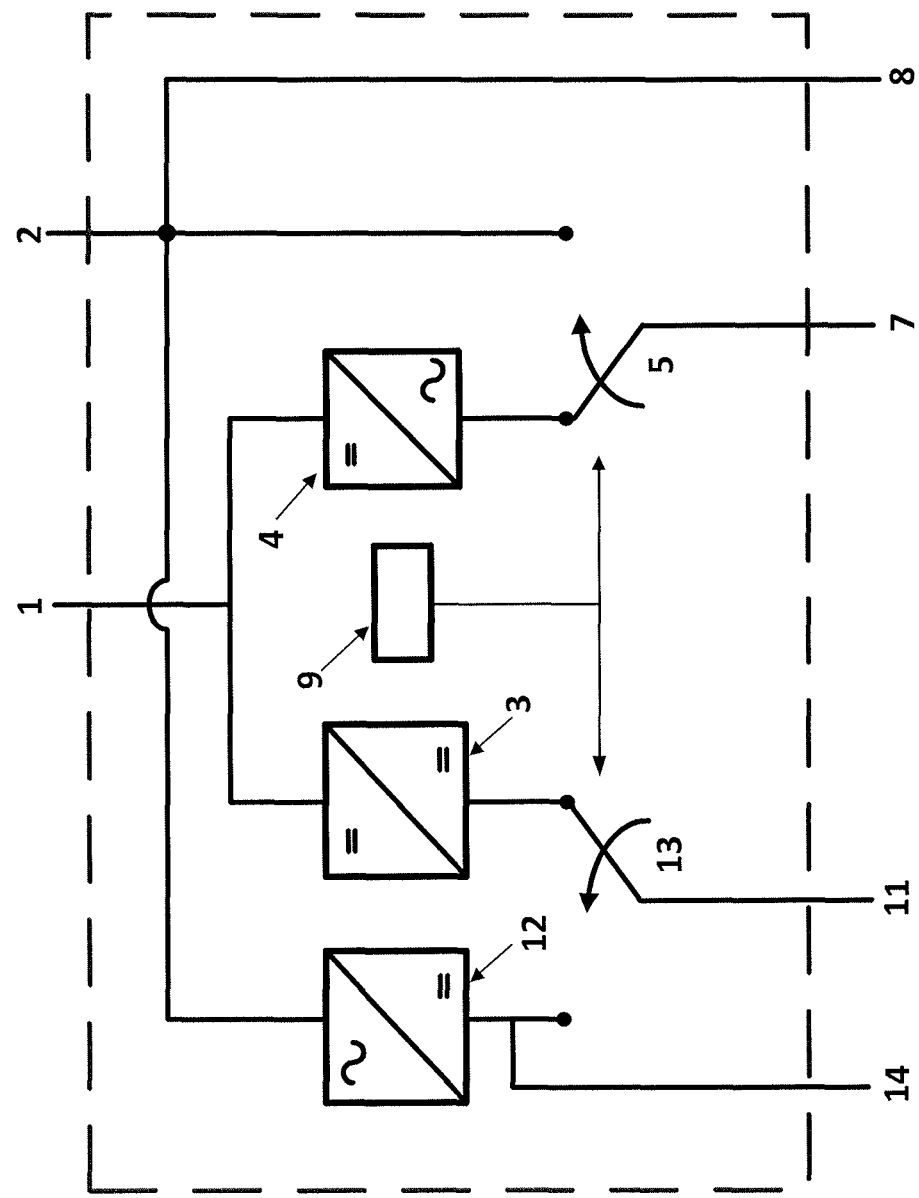
FIG. 3 shows a simplified diagram of the system of the proposed invention according to a third preferred embodiment of the invention.

Another option that allows feeding the output for DC loads (6) from the AC power source (2) corresponds to a preferred embodiment of the invention depicted in FIG. 3 comprising at least one DC output for critical loads (11) and a DC output for non-critical loads (14). In this case, in addition to the elements depicted in FIG. 1, the system comprises a second AC/DC converter (12) which is connected to the AC power source (2). The output of said second AC/DC converter (12) is connected to the DC output for non-critical loads (14) and also to the DC output for critical loads (11) depending on the position of a second selector (13). The DC output for critical loads (11) can be connected to either the second AC/DC converter (12) or to the DC/DC converter (3). The control unit (9) will be responsible for managing the operation of the second selector (13) for connecting the DC output for critical loads (11) to the second AC/DC converter (12) or to the DC/DC converter (3).

The operation of the system can therefore be similar to that described in relation to FIG. 1. In normal operation, the control unit (9) commands the first selector and the second selector (5, 13) to adopt a first position corresponding to the power supply of the DC output for critical loads (11) and of the AC output for critical loads (7) from the DC power source (1). In other words, the first selector (5) is in a first position corresponding to the connection of the DC power source (1) with the AC output for critical loads (7) through the first DC/AC converter (4), and the second selector (13) is in a first position corresponding to the connection of the DC power source (1) with the DC output for critical loads (11) through the DC/DC converter (3). In the case of anomalous operation (for example, the DC power source is not available), the control unit (9) commands the first selector (5) and the second selector (13) to adopt a second position corresponding to the power supply of the DC output for critical loads (11) and of the AC output for critical loads (7) from said AC power source (2). In other words, the first selector (5) goes to a second position corresponding to the direct connection of the AC power source (2) with the AC output for critical loads (7), and the second selector (13) goes to a second position corresponding to the connection of the AC power source (2) with the DC output for critical loads (11) through the second AC/DC converter (12).

In this case, normal operation is defined as the DC power source (1) being available and the first DC/AC converter (4) and the DC/DC converter (3) working. Anomalous operation is defined as at least one of the conditions defining normal operation not being complied with.

Figure 4:
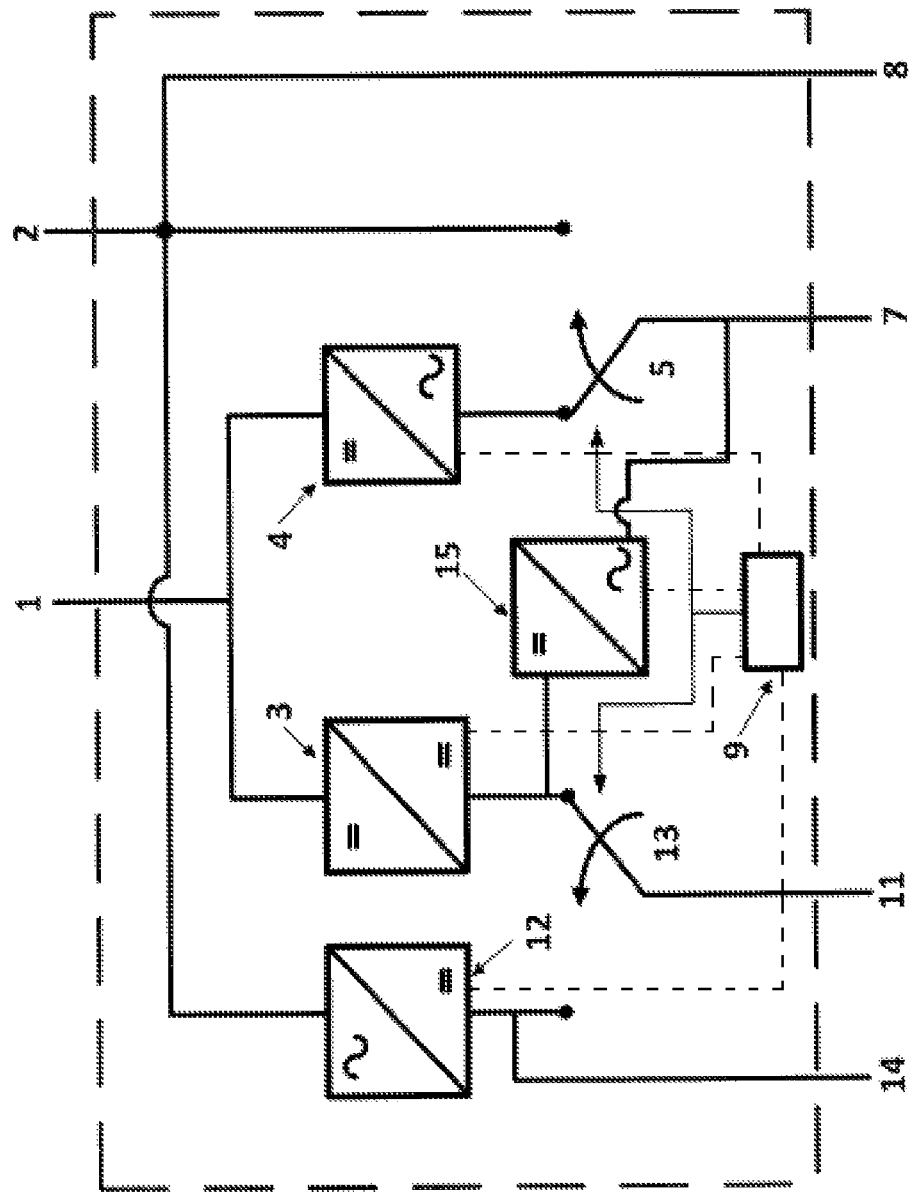
FIG. 4 shows a simplified diagram of the system of the proposed invention according to a fourth preferred embodiment of the invention.

The system depicted in FIG. 4 is similar to the system described in FIG. 3 but it further comprises a second DC/AC converter (15) connected between the output of the DC/DC converter (3) and the AC output for critical loads (7). Furthermore, as in the system described in FIG. 3, the system of FIG. 4 includes a second AC/DC converter (12) which is connected between the AC power source (2) and the DC output for non-critical loads (14). Furthermore, the DC output for critical loads (11) can be connected to either the DC output of the second AC/DC converter (12) or to the DC output of the DC/DC converter (3). A control unit (9) manages the operation of the second selector (13) such that the DC output for critical loads (11) can be fed from said second AC/DC converter (12) or from the DC/DC converter (3).

It is preferably contemplated in any of the configurations described herein that the control unit is integrated in the first DC/AC converter (4), in the second DC/AC converter (15), in the DC/DC converter (3), or in the second AC/DC converter (12).

With respect to the system depicted in FIG. 3, the system of FIG. 4 provides redundancy. For example, in the case of a failure of the DC power source (1) and of the second AC/DC converter (12), the DC output for critical loads (11) is fed from the AC power source (2) through the second DC/AC converter (15).

In a preferred embodiment, the system proposed in the present invention includes the DC power source (1) being a photovoltaic generator or an energy storage system, such as batteries, ultracapacitors or fuel cells, among others.

The invention claimed is:

1. A power supply system for electronic converters capable of providing at their output direct current and alternating current voltages from at least one DC power source (1) and at least one AC power source (2), the DC power source being a photovoltaic generator and the power supply system comprising:
   an output for DC loads (6) connected to an output of a DC/DC converter (3) an input of which is connected to the DC power source (1),
   an AC output for critical loads (7) connected to a first selector (5) configured for alternating between a first position where said AC output for critical loads (7) is connected to and output of a first DC/AC converter (4) the input of which is connected to the DC power source (1), and a second position where said AC output for critical loads (7) is connected to the AC power source (2),
   an AC output for non-critical loads (8) connected to the AC power source (2),
   a control unit (9) controlling the operation of said first selector (5); and
   a first AC/DC converter (10), an input of which is connected to the AC output for critical loads (7) and an output of which is connected to the output for DC loads (6).

2. The power supply system for electronic converters according to claim 1, wherein the control unit (9) is integrated in the first DC/AC converter (4), in the second DC/AC converter (15), in the DC/DC converter (3), or in the second AC/DC converter (12).

3. The power supply system for electronic converters according to claim 1, wherein the AC power source (2) is the power grid.

4. A method for operating the system according to claim 1, the method comprising:
   in normal operating conditions, the control unit (9) keeps the first selector (5) in a first position corresponding to the power supply of the AC output for critical loads (7) from the DC power source (1) through the first DC/AC converter (4); and
   in anomalous operating conditions, the control unit (9) operates the first selector (5) to go to a second position corresponding to the power supply of the AC output for critical loads (7) directly from the AC power source (2).

5. A power supply system for electronic converters capable of providing at their output direct current and alternating current voltages from at least one DC power source (1) and at least one AC power source (2), the DC power source being a photovoltaic generator and the power supply system comprising:

an output for DC loads (6) connected to an output of a DC/DC converter (3), an input of which is connected to a DC power source (1), an AC output for critical loads (7) connected to a first selector (5) configured for alternating between a first position where said AC output for critical loads (7) is connected to an output of a first DC/AC converter (4), an input of which is connected to the DC power source (1), and a second position where said AC output for critical loads (7) is connected to the AC power source (2), an AC output for non-critical loads (8) connected to the AC power source (2), a control unit (9) controlling an operation of said first selector (5), a DC output for critical loads (11) connected to a second selector (13) configured for alternating between a first position where said DC output for critical loads (11) is connected to the output of the DC/DC converter (3) the input of which is connected to the DC power source (1), and a second position where said DC output for critical loads (11) is connected to the output of a second AC/DC converter (12) the input of which is connected to the AC power source (2), a DC output for non-critical loads (14) connected to the output of the second AC/DC converter (12), where the control unit (9) further controls the operation of said second selector (13); and a second DC/AC converter (15) the DC side of which is connected to the output of the DC/DC converter (3) and the AC side of which is connected to the AC output for critical loads (7).

6. A method for operating the system according to claim 5, comprising:

in normal operating conditions, the control unit (9) keeps the first selector (5) in the first position corresponding to the power supply of the AC output for critical loads (7) from the DC power source (1) through the first DC/AC converter (4), and the second selector (13) in the first position corresponding to the connection of the DC power source (1) with the DC output for critical loads (11) through the DC/DC converter (3); and in anomalous operating conditions, the control unit (9) operates the first selector (5) to go to the second position corresponding to the power supply of the AC output for critical loads (7) directly from the AC power source (2), and the second selector (13) to go to a second position corresponding to the power supply of the DC output for critical loads (11) from the AC power source (2) through the second AC/DC converter (12).

* * * * *